Figure 1:
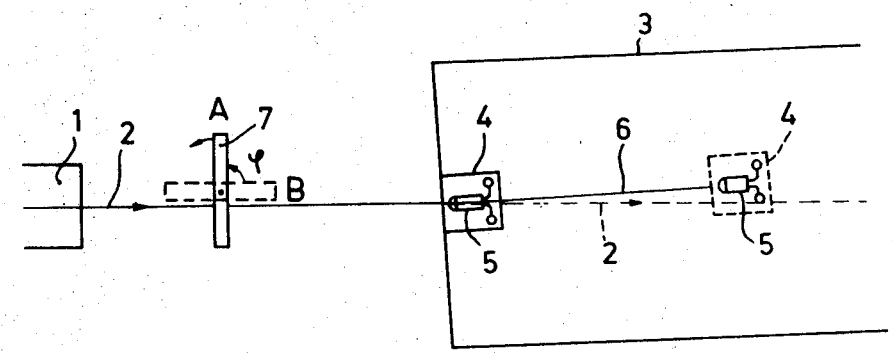

United States Patent

[11] 3,602,719

| | | |
|---|---|---|
| [72] | Inventor | Bernardus Antonius Johannus Jacobs<br>Emmasingel, Eindhoven, Netherlands |
| [21] | Appl. No. | 802,512 |
| [22] | Filed | Feb. 26, 1969 |
| [45] | Patented | Aug. 31, 1971 |
| [73] | Assignee | U.S. Philips Corporation<br>New York, N.Y. |
| [32] | Priority | Mar. 2, 1968 |
| [33] | | Netherlands |
| [31] | | 6803013 |

[54] APPARATUS FOR MEASURING ANGULAR POSITION OF AN OBJECT RELATIVE TO A RADIATION BEAM
5 Claims, 6 Drawing Figs.

[52] U.S. Cl..................................................... 250/231,
356/172
[51] Int. Cl....................................................... G01d 5/34
[50] Field of Search............................................ 250/236,
219 F, 231, 234; 356/172

[56] References Cited
UNITED STATES PATENTS

| 2,703,505 | 3/1955 | Senn............................ | 356/172 |
| 2,819,645 | 1/1958 | Koulikovitch................. | 356/172 |
| 2,960,612 | 11/1960 | Koulikovitch................. | 250/236 |
| 3,016,464 | 1/1962 | Bailey........................... | 250/219 |
| 3,401,590 | 9/1968 | Massey.......................... | 350/157 |

*Primary Examiner*—Walter Stolwein
*Attorney*—Frank R. Trifari

ABSTRACT: An arrangement for positioning an object relatively to a collimated beam of radiation is described. This positioning is effected by a rotating plane-parallel radiation-transmitting plate in the path of the radiation beam in a manner such that the axis of rotation is transverse to the radiation beam, the distance from the axis of rotation to the edge of the radiation beam exceeding one half of the thickness of the plate. The radiation detector may be rigidly secured to the object. Alternatively, a retrodirective mirror system may be rigidly secured to the object.

APPARATUS FOR MEASURING ANGULAR POSITION OF AN OBJECT RELATIVE TO A RADIATION BEAM

The invention relates to an arrangement for positioning an object relative to a collimated beam of radiation.

In machine tools, for example a lathe, and in optical instruments, for example a comparator, the relative displacement of a part of the machine tool or of the optical instrument is frequently measured by means of a beam of radiation. For example, the optical path length traversed by a beam reflected by the object is compared with that traversed by a beam which is coherent with the first beam and is reflected by a stationary object.

On precision measurements, direction of the displacement of the object should substantially coincide with that of the radiation beam. It is therefore an object of the present invention to provide an arrangement which satisfies this requirement in a comparatively simple manner.

The stated object is accomplished by providing a rotating plane parallel, radiation-transmitting plate inserted in the path of the beam of radiation so that the axis of rotation of the plate is transverse to the radiation beam, and the distance from the axis of rotation to the edge of the radiation beam exceeds one-half of the thickness of the plate. From the signal produced by a radiation-sensitive detector inserted in the path of the beam after its passage through the plate, the exact position of the axis of the object relative to the direction of the beam is determined.

The detector may be rigidly secured to the object. Alternatively, the detector and the electronic apparatus connected to it may be stationary. In the latter case, the radiation beam is reflected at a retrodirective mirror system rigidly connected to the object. This has the additional advantage that the radiation beam, after reflection, is deflected through an angle twice that of the deflection of the mirror so that the accuracy of the measuring arrangement is doubled.

The invention is based on the recognition that a narrow beam of radiation, for example, a laser beam, which falls on a plane-parallel plate at an angle of incidence of less than 90° is displaced through a distance which depends on the magnitude of the angle of incidence.

Figure 2A:
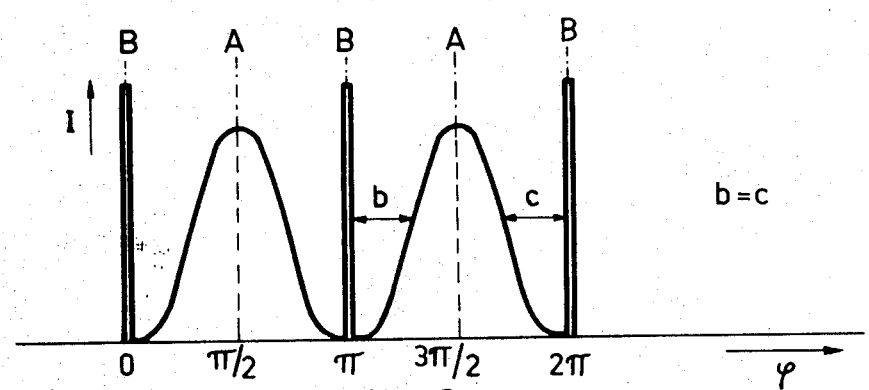
Figure 2B:
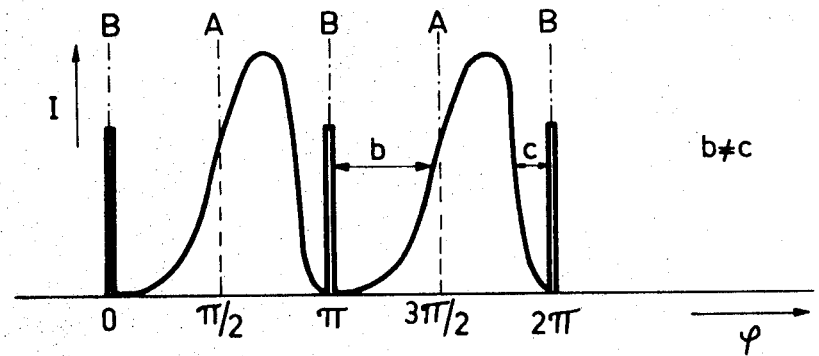
Figure 3:
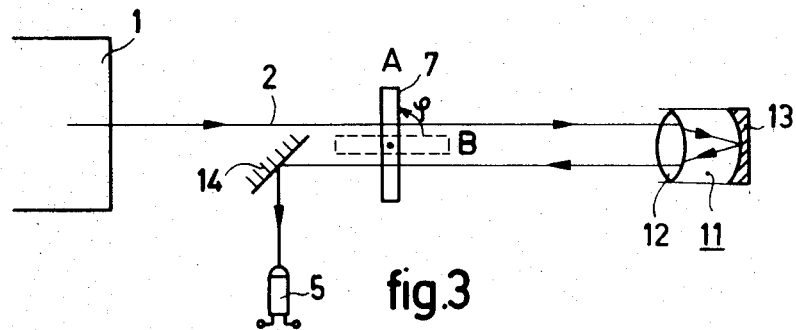
Figure 4:
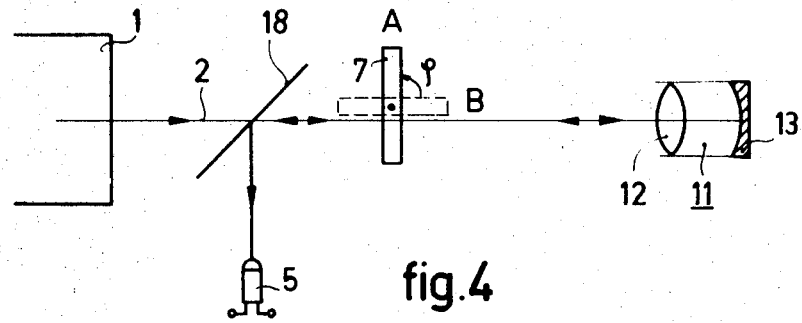

In order that the invention may readily be carried into the effect, reference will now be made, by way of example, to the accompanying diagrammatic drawings, in which FIG. 1 shows a first embodiment of an arrangement in accordance with the invention, FIGS. 2a and 2b are diagrams illustrating the operation of the arrangement shown in FIG. 1, and FIGS. 3 and 4 are modified embodiments of the arrangements shown in FIG. 1.

Figure 5:
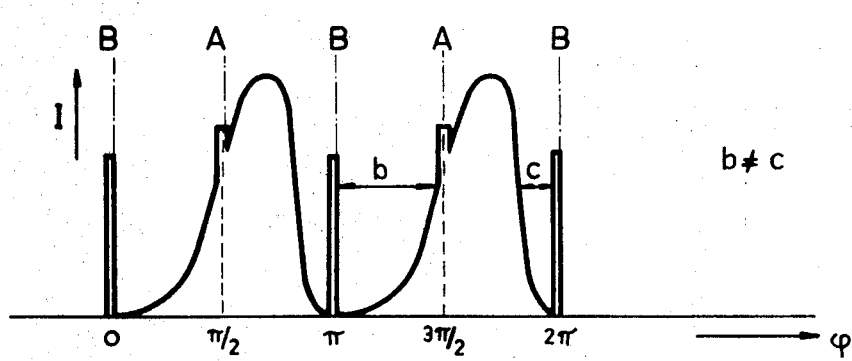

FIG. 5 illustrates the operation of FIG. 4.

Referring now to FIG. 1, a collimated laser beam 2 is emitted from a source 1 and falls on a radiation-sensitive detector 5 which is rigidly secured to the measuring slide 4 of a measuring bench 3. It is assumed that the detector 5 and the measuring slide 4 are so arranged relative to the measuring bench 3 that the intensity of the beam of radiation intercepted by the detector 5 is a maximum. A plane-parallel glass plate 7 is inserted in the beam path at a location relative to the radiation beam such that in position B, shown by broken lines, the beam 2 closely passes along one of the plane-parallel faces of the plate 7. When the plate 7 is rotated from this position about an axis at right angles to the direction of the radiation beam through an angle $\Phi$, the beam is refracted at the plane-parallel faces of the plate. The beam emerging from the plate 7 has suffered a parallel displacement relative to the beam incident on the plate. The displacement is a maximum when the rotation angle $\Phi$ is small and hence the angle of incidence of the plate 7 is approximately 90°. The displacement is a minimum when the angle of rotation $\Phi=90°$ and hence the angle of incidence is 0° (position A of the plate).

Thus, the intensity I of the radiation striking the detector 5 has the pattern shown in FIG. 2a. For $\Phi=0$ (position B of the plate) the intensity is a maximum. For $\Phi$ slightly different from 0 the intensity is substantially zero, because in this case the displacement of the beam is a maximum. With increasing angle of rotation $\Phi$ the intensity gradually increases to a maximum value at $\Phi=\pi/2$. The intensity then gradually decreases to zero for $\Phi$ substantially equal to $\pi$. For $\Phi$ exactly equal to $\pi$ the intensity again is a maximum. The transition from minimum to maximum intensity for values of $\Phi$ equal to $\pi$ or an integral multiple of $\pi$ is very sharp. The curve $I=f(\Phi)$ is symmetrical with respect to the values $\Phi=(2n+1)/2\ \pi$ (where $n$ is an integer).

When the slide 4 and hence the detector 5 are displaced the intensity pattern $I=f(\Phi)$ will not change if the axis 6 of the slide 4 is parallel to the radiation beam 2. When the axis 6 and the beam 2 are at a small angle to one another, the intensity $I$ will have the shape shown in FIG. 2b. For $\Phi=0$, $I$ and hence the signal produced by the detector again is a maximum and for a value of $\Phi$ differing only slightly from 0 and from $n\pi$ (where $n$ is an integer) will again be a minimum. The maximum for angles between $\Phi=n\pi$ and $\Phi=(n+1)\pi$ now does not lie at $\Phi=(2n+1)/2\ \Phi$ but at an angle differing from this value. An oscillograph reproducing the amplified signal will show an asymmetrical curve flanked by narrow peaks. The degree of asymmetry can be exactly determined by means of the distances $b$ and $c$ (FIG. 2b).

Rotation of the radiation beam 2 or of the axis 6 of the measuring bench enables the asymmetrical curve produced by the detector 5 and shown by the oscillograph to change into a symmetrical curve.

It has been found that by this semivisual method a transverse displacement of the detector 5 of 30 $\mu$m. can still be accurately observed. Obviously the use of appropriate electronic devices will permit again by a considerable factor.

In the arrangement shown in FIG. 3 the detector 5 is stationary. A retrodirective system 11 comprising a lens 12 and a concave mirror 13 is rigidly secured to the measuring slide (not shown). The glass plate 7 is arranged so that in its position B the laser beam 2 before and after reflection travels closely past the plate. The beam 2 twice passes through or twice passes along the rotating glass plate 7 and after reflection at a mirror 14 strikes the detector 5.

The electric signals produced in the detector 5 are similar to those produced in the arrangement shown in FIG. 1. However, the measuring accuracy is doubled because with a displacement $\Delta$ of the measuring slide 4 and hence of the retrodirective system 11 at right angles to the direction of the beam 2 the transverse displacement of the laser beam reflected at the retrodirective system 11 will be 2$\Delta$. Consequently, the maxima of the symmetrical and asymmetrical curves (FIGS. 2a and 2b respectively) will be sharper.

A further advantage consists in that the electric wiring connected to the detector 5 and any electronic apparatus is stationary.

In the arrangement shown in FIG. 4, the collimated laser beam 2 passes through a half-silvered mirror 18, is reflected at the retrodirective system 11 and after reflection at the half-silvered mirror 18 impinges on the detector 5.

In the case of optimum alignment of the measuring slide (not shown) to which the system 11 is rigidly secured, the non-reflected beam and the beam reflected at the system 11 coincide. In the position A of the rotating plate 7, part of the collimated beam emitted from the source 2 is reflected at one of the plane-parallel faces of the plate 7. This reflected part after reflection at the half-silvered mirror 18 strikes the detector 5, and this means an amplification of the signal produced by the detector 5. Thus, upon rotation of the plate 7, spikes superposed on the curve will be produced for $\Phi(2n+1)/(2)\ \pi$ which gives an additional symmetry indication (FIG. 5).

What is claimed is:

1. Apparatus for measuring the angular position of an object with respect to a collimated beam of radiation so as to detect direction of displacement of said object comprising a source of radiation for producing a collimated beam, a plane-parallel plate rotatably mounted about an axis which is transverse to said beam of radiation and is positioned at a distance greater than one-half the thickness of said plate from the boundary of said beam of radiation, means for rotating said plate, said plate being capable of transmitting said radiation therethrough when said plate has been rotated about its axis of rotation so that it lies in the path of said beam, radiation detection means for detecting said collimated beam after it has passed said plate, different amounts of radiation being incident on said detector as said plate is rotated about its axis, said detector being located with respect to said object so that the lateral relative disposition of the detector and said beam incident thereon is dependent on the relative position of said object with respect to said collimated beam, and means for indicating asymmetry in the periodic output of said detector when said plate is continuously rotated about said axis, said output being substantially symmetrical when said object is positioned in the desired direction relative to said collimated beam.

2. The apparatus according to claim 1 wherein said radiation detector is rigidly secured to the object.

3. The apparatus according to claim 1 wherein said radiation detector is in a stationary position remote from said object.

4. The apparatus according to claim 3 further comprising a retrodirective mirror system rigidly secured to said object for reflecting said collimated beam toward said radiation detector thereby doubling the measuring accuracy.

5. The apparatus according to claim 4 further comprising a half-silvered mirror positioned in the path of said collimated beam between said source of radiation and said retrodirective system so as to reflect the radiation beam from said retrodirective system and from said plate to the radiation detector.